United States Patent
Rozenblit et al.

[19]

[11] Patent Number: 6,049,724
[45] Date of Patent: Apr. 11, 2000

[54] ULTRA-CLEAN VOLTAGE POWER SUPPLY GENERATOR

[75] Inventors: Dmitriy Rozenblit, Irvine; Mark Oskowsky, Newport Coast; William J. Domino, Yorba Linda, all of Calif.

[73] Assignee: Conexant Systems, Inc., Newport Beach, Calif.

[21] Appl. No.: 08/892,444

[22] Filed: Jul. 14, 1997

[51] Int. Cl.⁷ .............................. H04Q 7/32; H04Q 7/18
[52] U.S. Cl. ..................... 455/572; 455/573; 455/574; 455/38.3; 455/343; 370/311
[58] Field of Search .................... 455/550, 572, 455/574, 38.3, 571, 573, 343; 370/311; 327/379, 380, 381, 382, 392, 386, 393, 447, 530, 531, 548, 547, 544, 545, 104; 326/21, 23, 28

[56] References Cited

U.S. PATENT DOCUMENTS

| | | | |
|---|---|---|---|
| 4,272,650 | 6/1981 | Bolgiano et al. | 455/572 |
| 4,995,072 | 2/1991 | Pedigo | 455/572 |
| 5,203,020 | 4/1993 | Sato et al. | 455/574 |
| 5,333,176 | 7/1994 | Burke et al. | 455/572 |
| 5,666,355 | 9/1997 | Huah et al. | 455/574 |

*Primary Examiner*—Wellington Chin
*Assistant Examiner*—Keith Ferguson
*Attorney, Agent, or Firm*—Lyon & Lyon LLP

[57] ABSTRACT

A DC voltage power supply for a time division multiple access (TDMA) radio system is provided. The DC voltage power supply apparatus includes an AC signal source, a switching transistor, a controlling signal source, a voltage converter circuit, and a capacitor. The AC signal source provides an AC signal to the DC voltage power supply. The switching transistor is coupled to the clock for switching on and off the clock signal. The controlling signal source is coupled to the switching transistor for turning the switching transistor off during a transmission or reception period and for turning the switching transistor on during an idle period. The voltage converter circuit is coupled to the switching transistor and generates a DC output voltage from the AC signal. Finally, the capacitor is coupled to the voltage converter such that the capacitor is charged by the DC output voltage when the switching transistor is turned on and the capacitor holds the DC output voltage by discharging when the switch is turned off.

21 Claims, 4 Drawing Sheets

ULTRA-CLEAN VOLTAGE POWER SUPPLY GENERATOR

FIELD OF THE INVENTION

The present invention relates to the field of power supply circuits and more particularly to circuits for generating clean voltage power supply for time division multiple access (TDMA) radio system devices.

BACKGROUND ART

Today, digital cellular radio is rapidly displacing analog cellular phone systems as the cellular communication of choice throughout the world. For example, the European digital cellular radio system, GSM (Global System for Mobile communications) is currently in wide use in over 50 countries. The digital cellular radio system like GSM is a fully digital system based on a time division multiple access (TDMA) system.

The GSM allows transmission of up to 8 different messages in one channel. Further, the GSM system transmits and receives data in the form of frames at different times. The transmission and reception of data frames usually utilize antennas. Hence, GSM requires a switching circuit to switch to and from transmission mode to reception mode.

The TDMA systems such as GSM utilize portable cellular telephone devices (i.e., handsets) to communicate. These wireless mobile communications devices such as cellular phones allow people to overcome the barrier of distance and the requirement of wires to communicate wherever they may be located. In recent years, due in large part to the design of smaller and more efficient power supply circuits, wireless mobile communications devices have evolved to fit into the palm of a hand.

Most of the power supply circuits in a typical wireless handset operate from a positive voltage power supply, with the system battery's negative terminal connected to the ground plane of the handset. However, some circuits often require a negative voltage power supply without using a second battery. For instance, PIN diode switches require a strong reverse bias from a negative power supply voltage to achieve adequate radio frequency (RF) isolation when turned off. Also, GaAs MESFET and other depletion FETs usually require negative gate bias for proper operation. In both of these instances, the current drawn from the negative supply is usually much smaller than 1 mA (milliampere).

One of the conventional approaches for developing a voltage of polarity opposite of the system battery employs a switching type of DC-DC converter. The DC-DC converter efficiently generates an AC waveform by switching the DC input at some predetermined frequency. Then the AC voltage swing is stepped up or down as needed, and then finally rectified and filtered. If a negative voltage is desired, the polarity of rectification is set accordingly. The application of the switching DC-DC converter is not limited to negative outputs. In many instances, the switching DC-DC converter is used to derive a positive voltage that is greater than the battery input. The DC-DC converter technology is highly developed and integrated chips (ICs) performing these functions are widely available in the market.

Unfortunately, for the wireless handset, and for radio applications in general, the disadvantage of the switching DC-DC converter is the unwanted emission of its switching frequency and harmonics, which cause interference with the radio circuits. That is, power supplies for these portable TDMA devices transmit harmonics and noise from their internal circuits to the rest of the TDMA device. In particular, the internal switching of the DC-DC converter produces harmonics that are transmitted to the rest of the power supply circuit to reach other sensitive parts of the wireless transceiver. In addition, switching between transmission and receive modes produces added noise that are transmitted to the rest of the power supply circuit and the transceiver. In this manner, noise severely degrades the reception and transmission quality of a TDMA device.

Furthermore, TDMA systems require switching between transmission and receive modes, and also at times, switching between two antennas. PN junction based PIN diodes have been widely used as switching devices for these switching modes due to their optimum characteristics in linearity and loss properties. Generally, one pin diode acts as a switch for a transmitter and another pin diode regulates a receiver. When one diode for the transmitter, for example, turns on, the other diode connected to the receiver, ideally, should have infinite impedance to prevent power from going into the receiver. In practice, a large signal voltage swing can begin to turn on a diode that is supposed to be off, allowing a portion of the signal to pass through when the signal is supposed to be blocked.

One design approach has addressed the forward bias problem of the diode by introducing a reverse voltage larger than the incoming input voltage swing on the PIN diode. This method typically uses a negative step-up voltage regulator. However, this method has been inefficient and costly to implement. First, the negative step-up voltage regulator is expensive to manufacture because it includes inductors, capacitors, etc. Second, since the voltage regulator is on all the time, the switching power voltage supply produces large harmonics resulting in undesirable transmission of noise.

Thus, what is needed is a circuit and method of providing a clean voltage power supply while minimizing transmission of noise and harmonics associated with AC signals and switching of transistors to other parts of a TDMA transceiver.

SUMMARY OF THE INVENTION

The present invention comprises an apparatus and method for providing a DC voltage power supply for a time division multiple access (TDMA) mobile cellular communication device characterized by an alternating idle period and a transmission or reception period. The DC voltage power supply apparatus includes an AC signal source, a switching transistor, a controlling signal source, a voltage converter circuit, and a capacitor. The AC signal source provides an AC signal to the power supply apparatus. The switching transistor is coupled to the AC signal source. The controlling signal source is coupled to the switching transistor for switching the AC signal source off during a transmission or reception period and for switching the switching transistor on during an idle period. The voltage converter circuit is coupled to the switching transistor and generates a DC output voltage from the AC signal. Finally, the capacitor is coupled to the voltage converter such that the capacitor is charged by the DC output voltage when the switching transistor is turned on and the capacitor holds the DC output voltage by discharging when the switch is turned off. The capacitor thus provides clean DC voltage since the AC signal and switching harmonics are switched off during the transmission or reception period.

BRIEF DESCRIPTION OF THE DRAWINGS

The accompanying drawings, which are incorporated in and form a part of this specification, illustrate embodiments of the invention and, together with the description, serve to explain the principles of the invention.

DESCRIPTION OF THE PREFERRED EMBODIMENTS

A novel circuit for supplying a clean voltage power supply to radio transceivers for mobile TDMA devices is disclosed. In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail so as not to unnecessarily obscure aspects of the present invention.

The present invention to time division communication systems such as TDMA and time division duplex (TDD) systems where time periods of radio signal transmission or reception are delimited by periods of no activity. That is, time division communication systems are characterized by an alternating sequence of idle period and transmission/reception period. Although the present invention is described in conjunction with TDMA system devices, those skilled in the art will appreciate that the present invention is equally suitable to any time division communication systems utilizing an alternating periods of transmission/reception and no activity.

Figure 1:
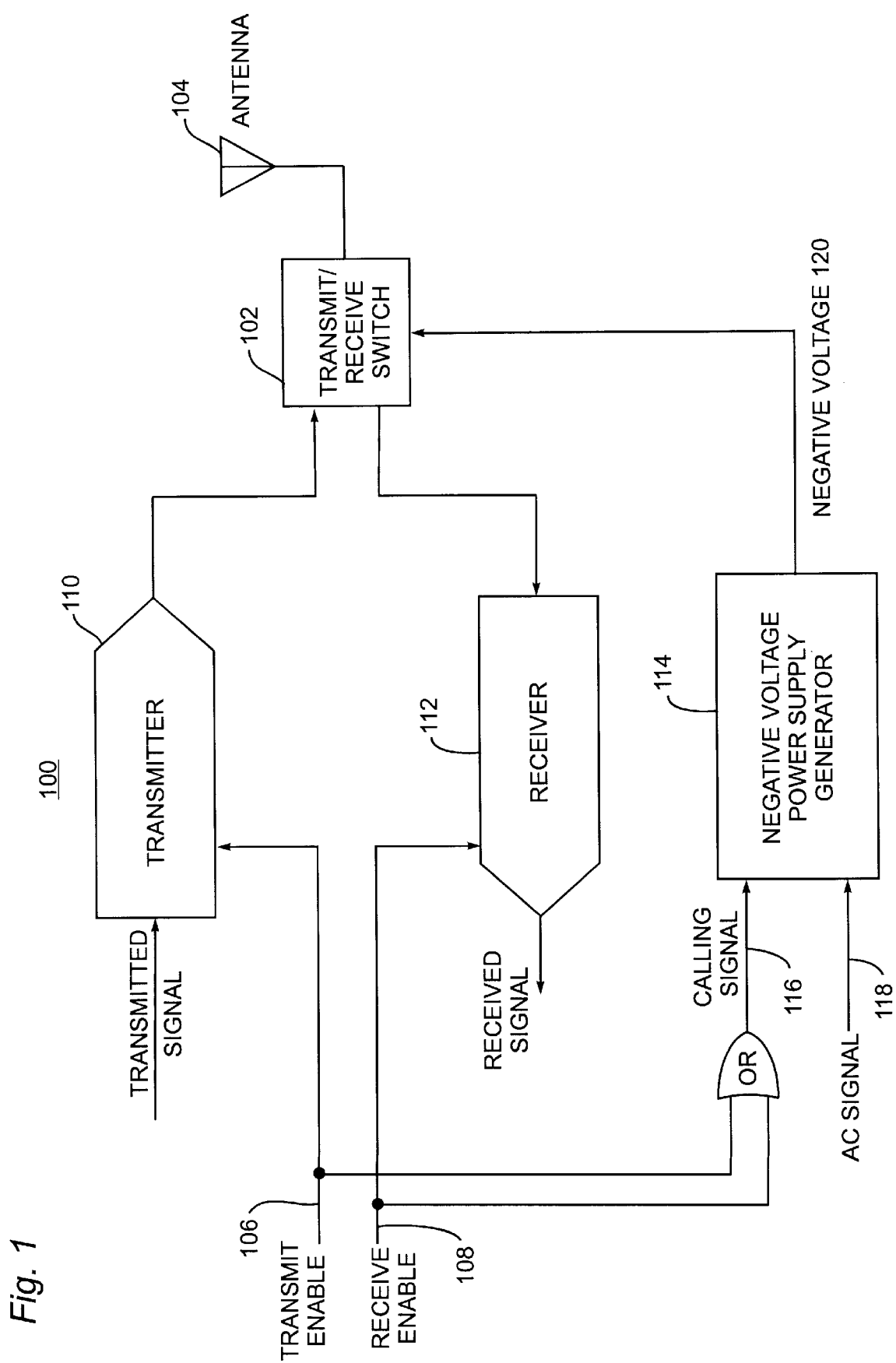
FIG. 1 illustrates a simplified block circuit diagram of a TDMA radio system incorporating an exemplary embodiment of the present invention.

FIG. 1 illustrates a simplified block circuit diagram of a TDMA radio system 100 incorporating an exemplary embodiment of the present invention. In the TDMA radio system 100, transmission and reception of signals occur at different times. In addition, signal is neither transmitted nor received during idle modes. To switch between the transmit and receive modes, a transmit/receive switch 102 is provided to switch an antenna 104. The transmit/receive switch 102 usually requires a negative supply voltage to reverse bias switching diode or transistors to counteract large input voltage swing.

The exemplary TDMA radio system 100 of FIG. 1 operates by switching between an idle mode and a transmit/receive mode. The transmit enable line 106 and receive enable line 108 control the transmission and reception modes of the TDMA radio system 100. Specifically, the transmit enable line 106 enables transmission of signal through a transmitter 110, the transmit/receive switch 102, and the antenna 104 for broadcast. Similarly, the receive enable line 108 enables reception of signals from the antenna 104 to the receiver 112 through the transmit/receive switch.

In the exemplary TDMA radio system 100, the transmit enable line 106 and receive enable line 108 are OR gated to produce a gating signal 116, which is inputted into a negative voltage power supply generator 114 to control an AC signal 118 applied as an input to the negative voltage power supply generator 114. Using the AC signal 118, the negative voltage power supply generator 114 produces a negative voltage 120. When both the transmit enable line 106 and the receive enable line 108 are inactive (i.e., idle), the gating signal turns on the AC signal 118. During this time, the negative voltage power supply generator 114 samples and stores the negative voltage 120 for use during a subsequent transmit or receive (i.e., active) mode.

Afterward, when either the transmit enable line 106 or the receive enable line 108 is active, the gating signal 116 switches off the AC signal 118. In response, the negative voltage power supply generator 114 holds the output voltage 120 by using the negative voltage stored during the previous idle mode. In this manner, a constant and clean output voltage 120 is provided to the transmit/receive switch 102. In particular, harmonics previously associated with gating and AC signals are not transmitted to the other parts of the TDMA radio system 100.

Figure 2:
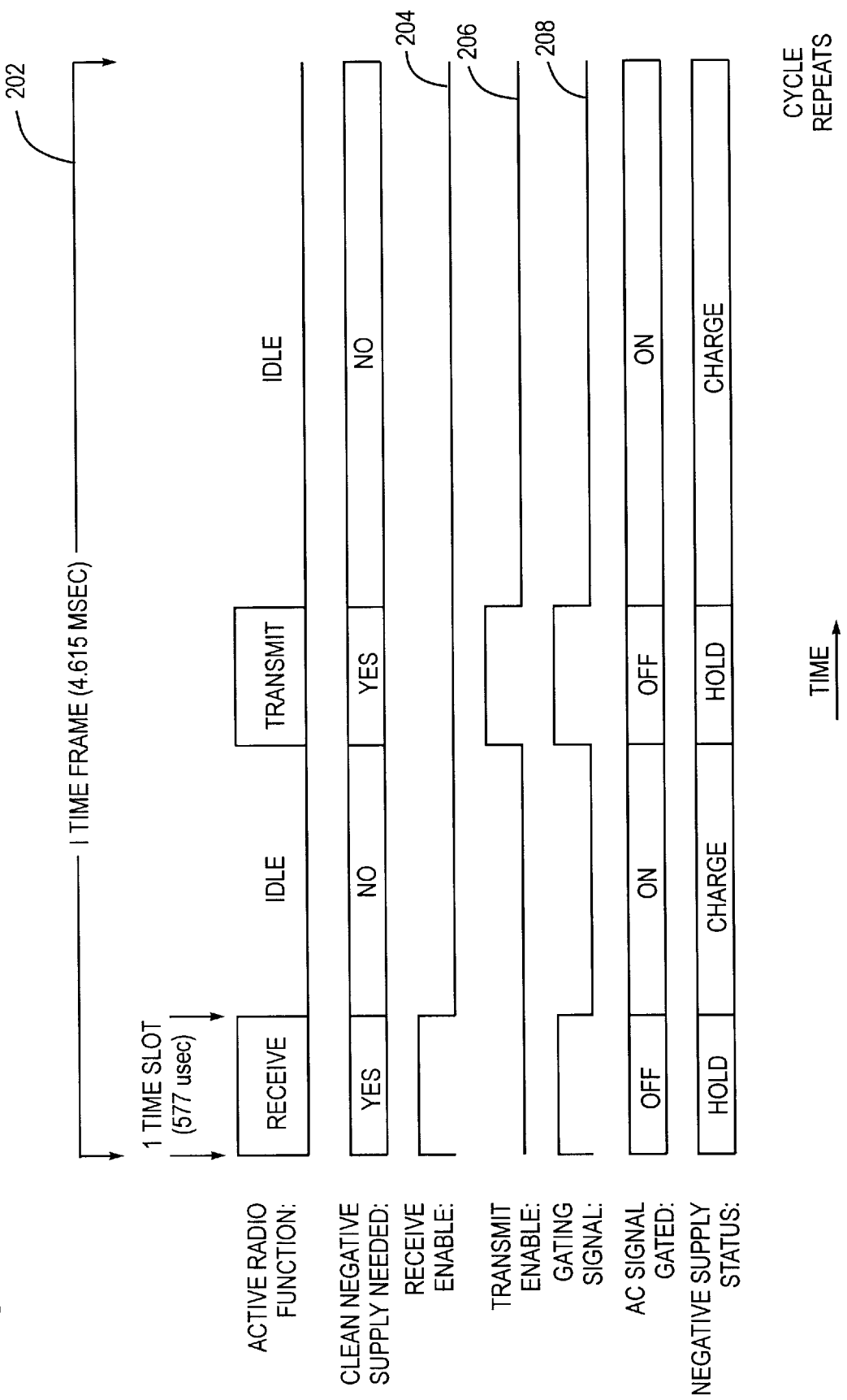
FIG. 2 illustrates a timing diagram of a TDMA radio system's exemplary time frame.

A timing diagram of the TDMA radio system's exemplary time frame 202 is illustrated in FIG. 2. The time frame 202 shows the repetitive cycle of receive/standby/transmit modes. The exemplary time frame 202 consists of 4.615 millisecond (msec). Active radio functions such as transmission and reception last 577 microsecond (usec). During active radio functions, clean voltage supply is needed for transmission of noise-free data; during idle times, the need for a clean voltage is not critical since no data is being transmitted or received.

When receive enable 204 is active, the gating signal 208 is also on or active. In response to the active gating signal 208, the AC signal is gated off and clean negative power supply is provided to the rest of the circuit so that signals are received free of noise and harmonics. When the active radio function switches to idle mode, clean power supply is no longer required. Hence, the gating signal 208 is turned off and the AC signal is gated on which activates charging of the negative voltage power supply unit. For transmit time slot, the transmission of signals also requires clean power supply. The transmit enable 206 becomes active and turns on the gating signal 208. In response, the AC signal is gated off. Hence the charged negative power supply is provided to the transceiver free of distortions and noise from the AC signal and gating effects.

These alternating sequences of activity and inactivity provide a clean power supply to the transceiver of a TDMA radio system. According to an embodiment of the present invention, a clean voltage power supply is provided to sensitive parts of a radio transceiver by charging a capacitor when a clock is on and discharging the capacitor when the clock is switched off. In one embodiment, a negative voltage is generated from the positive swing clock signal. The negative voltage maintains reverse bias across switching diodes. The other parts of the transceiver receives the negative voltage supply when it is not idle. In an alternative embodiment, a positive voltage power supply generator provides a positive DC voltage to a TDMA radio system.

Figure 3:
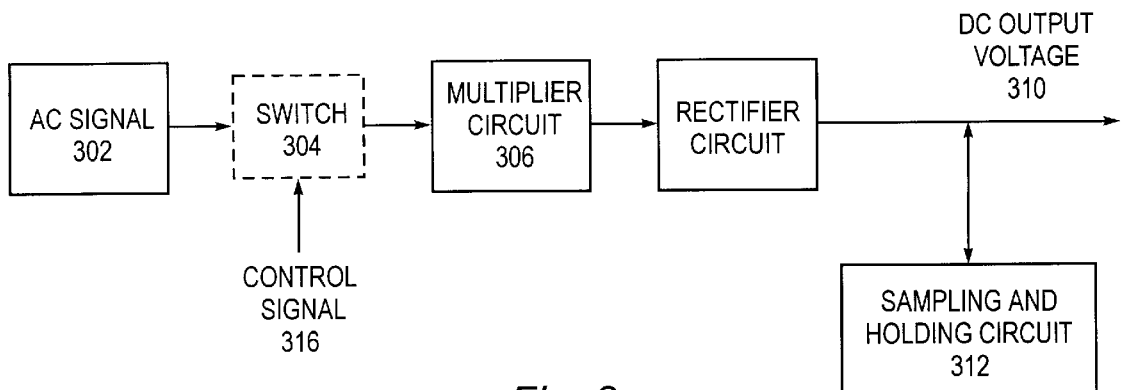
FIG. 3 illustrates a block diagram of a voltage power supply circuit according to a preferred embodiment of the present invention.

FIG. 3 illustrates a block diagram of a voltage power supply circuit 300 according to a preferred embodiment of the present invention. The voltage power supply circuit 300 is comprised of an AC signal 302, a switch 304, a multiplier circuit 306, a rectifying circuit 308, and a DC output sampling and holding circuit 312. AC signal 302 include AC signals derived by any means such as through switching of a DC input, a logic circuit clock, or an oscillator. The AC signal 302 is inputted into the switch 304 which also accepts a gating signal 316 as input. The switch 304 switches the AC signal 302 on and off in response to a gating signal 316.

The multiplier circuit 306 transforms the voltage of the AC signal 302 by raising or lowering the AC voltage with little or no power loss. This voltage multiplication obviously only takes place when the switch 304 switches the AC signal 302 on. Otherwise, the AC signal 302 is cut off from the rest of the circuit and no transformation of the AC voltage occurs.

The transformed AC voltage at the output of the multiplier circuit 306 is then rectified by the rectifier circuit 308 to a desired DC voltage 310. The preferred embodiment of the present invention rectifies the AC voltage to a negative DC voltage. Even though such negative voltage is generated, those skilled in the art will recognize that the present invention is readily adaptable to circuits requiring positive DC voltages by rectifying the AC voltage to a positive DC voltage.

The sampling and holding circuit 312 then samples the DC voltage 310 and stores the DC voltage 310. It should be noted that the DC voltage 310 is generated from AC signal 302 only when the AC signal 302 is switched on by the switch 304. Hence, the sampling and holding circuit 312 samples the DC voltage 310 when the AC signal is being propagated through the rest of the circuit. After having stored the DC voltage 310 when AC signal was gated on, the sampling and holding circuit 312 holds the DC voltage 310 when the AC signal 302 is gated off.

In the time division communication system, the AC signal is gated on (i.e., switched on) during idle time slots, and gated off during active (transmit or receive) time slots. The DC output is then held during the active time slot. If the current draw from the DC output is small, then the DC voltage drops only minimally before the next idle time slot when the AC signal is gated on again. As a result, during the active time slots, the unwanted emissions normally attributable to a DC-DC converter are not generated at all.

Figure 4:
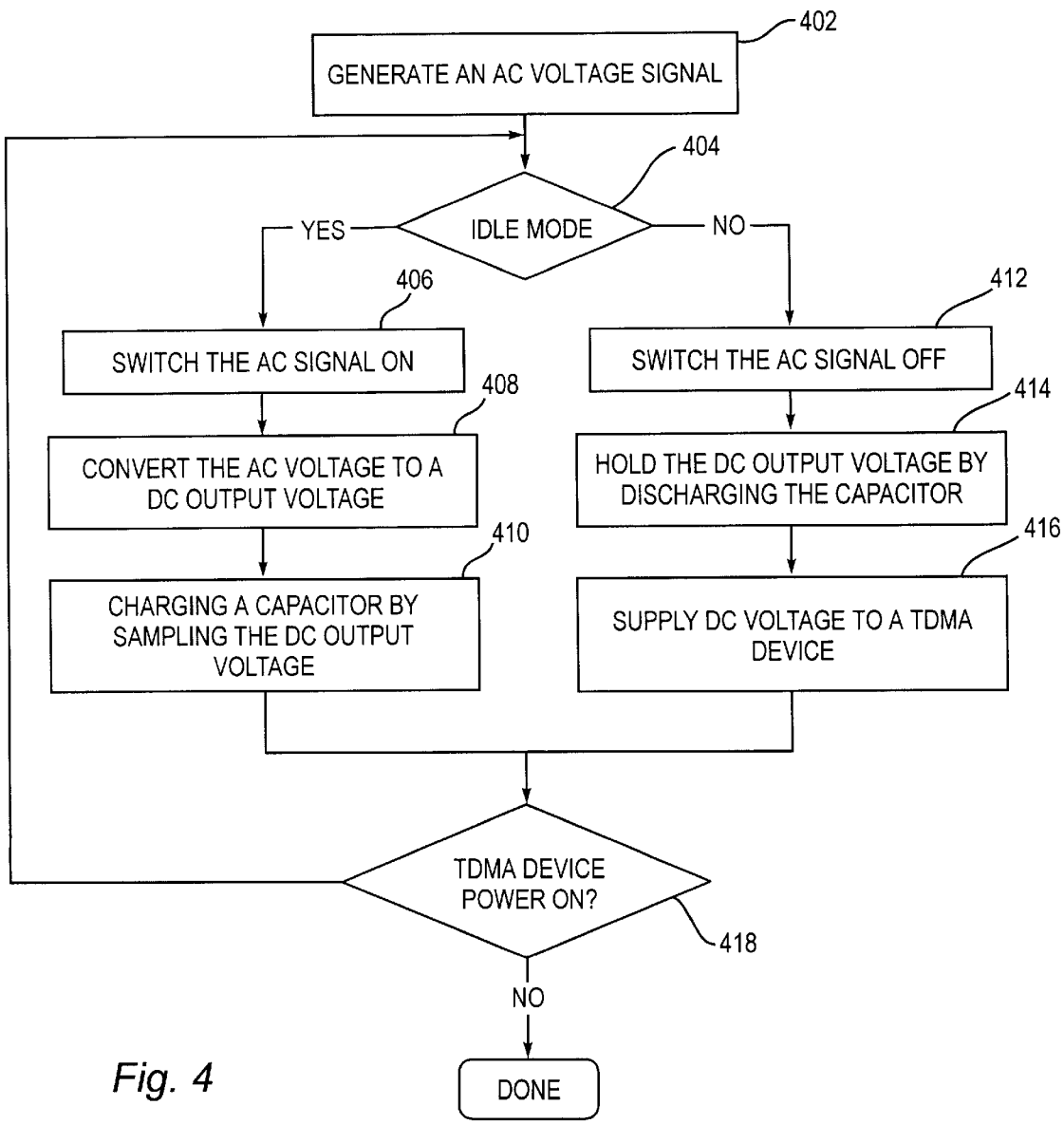
FIG. 4 illustrates a flowchart of the steps involved in generating a clean voltage power supply to a TDMA device according to the present invention.

A flowchart of the steps involved in generating a clean voltage power supply to a TDMA device according to the present invention is illustrated in FIG. 4. In step 402, an AC signal characterized by AC voltage is generated from an AC signal source. In steps 404 and 406, if the communication mode of the TDMA device is idle (i.e., non-transmission and non-reception), the AC signal is switched on. The AC signal voltage is then converted to a DC output voltage through a multiplier and a rectifier in step 408. In step 410, the DC output voltage charges a capacitor. Then in step 418, if TDMA device is powered on, the process returns to steps 404 and 412 for further idle mode or transmission/reception mode.

Subsequently, if the communication mode of the TDMA device is either transmission or reception as in steps 404 and 412, the AC signal is switched off. Then, the capacitor which was previously charged to a DC output voltage during idle mode is discharged in step 414. This discharge from the capacitor supplies a DC voltage to a TDMA device during the transmission or reception mode in step 416. If the TDMA device is still on as in step 418, the process repeats by returning to step 404. Otherwise, the TDMA device is off and the process terminates as shown in steps 418 and 420.

Figure 5:
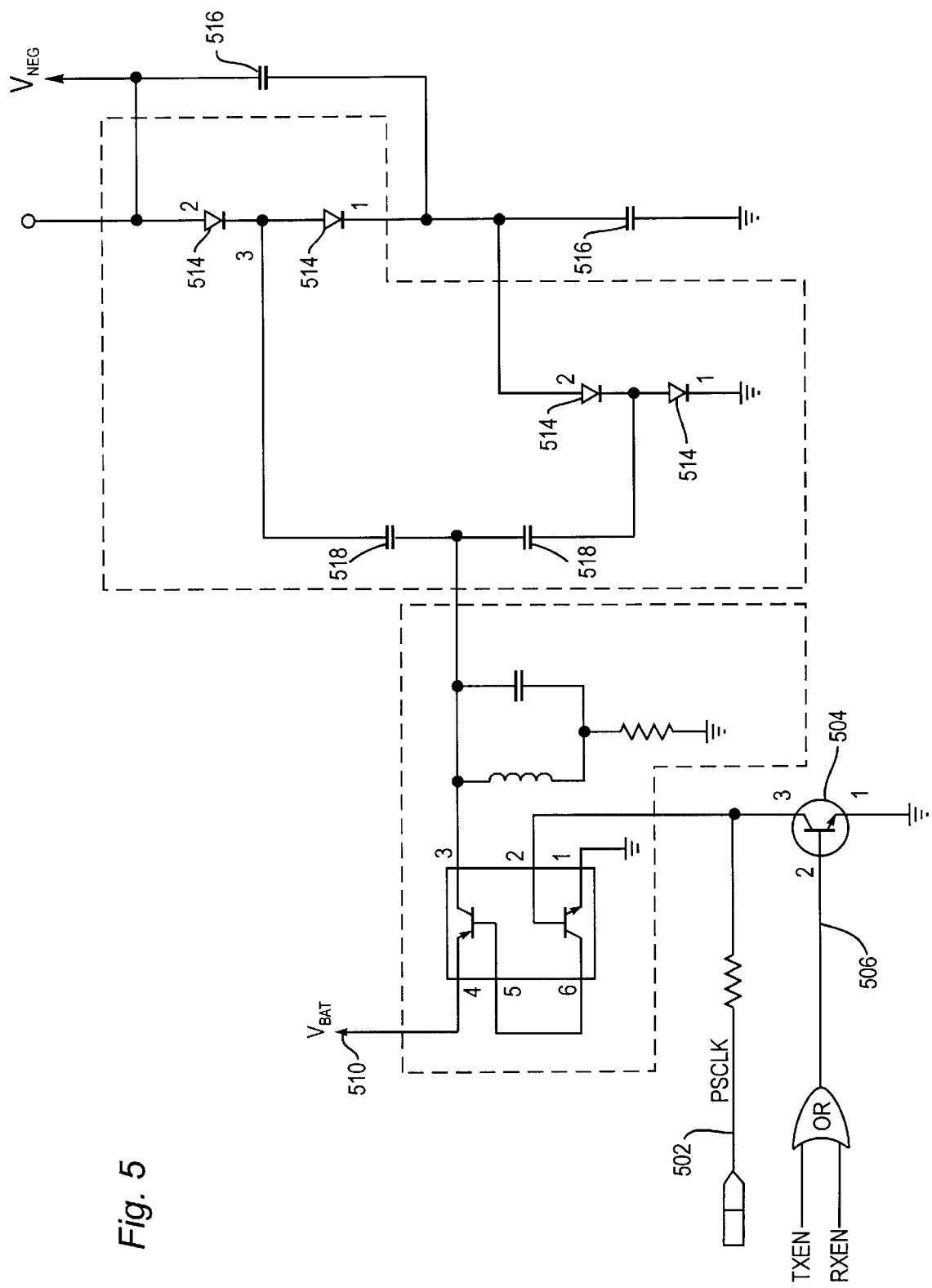
FIG. 5 illustrates one circuit embodiment of the voltage power supply generator for supplying clean voltage to a TDMA device according to the present invention.

FIG. 5 illustrates one circuit embodiment of the voltage power supply generator for supplying clean voltage to a transceiver in a TDMA radio system device according to the present invention. The AC signal is represented by a clock signal 502 of 200 kHz, which may be provided by commonly available ICs. Although the present embodiment uses a frequency of 200 kHz, those skilled in the art will no doubt recognize that the present embodiment is equally well suited for use with other high frequency AC signals.

The clock signal 502 is gated by a digital transistor 504, which is controlled by a logical OR gate of RXEN (receive enable) and TXEN (transmit enable) lines. The clock signal 502 is amplified and the amplified signal is then used to drive an LC (i.e., inductor-capacitor) tank circuit to achieve a large voltage swing. The transformed clock signal is then rectified and filtered by a classical voltage quadrupler which consists of diodes and capacitors. In the present embodiment, the output voltage generated is approximately −12 V when a +4.8 V of battery is used in the circuit.

With reference still to FIG. 5, the present embodiment includes a switching transistor (i.e., switch) 504 having an emitter, a collector, and a base. The switching transistor 504 is coupled to the clock signal 502 at its collector. A gating signal 506 is coupled to the base of the digital transistor 504 and controls the digital transistor 504 by switching the clock signal 502 on and off. The emitter of the digital transistor 504 is grounded.

During idle (non-transmit and non-receive) modes, the output of the OR gate is "0" or off because no signal is being transmitted or received. Hence, the gating signal 506 turns or switches the switching transistor 504 off. When the switching transistor 504 is off, it acts as an open circuit of infinite impedance to the clock signal 502. As a result, the clock signal is inputted into the voltage transforming circuit 508. The voltage transforming circuit 508 draws power from a battery 510 and raises (i.e., amplifies) the AC voltage level of the clock signal. The raised AC voltage of the clock signal is then filtered by a pair of capacitors 518 and invertingly rectified by the rectifying diodes 514 to produce a negative DC voltage. This negative DC voltage is then sampled by a pair of holding capacitors 516 which are electrically charged during the idle mode. The negative DC voltage is coupled and supplies DC voltage to the transmit/receive switch of a TDMA radio system illustrated in FIG. 1. It is noted that during the idle mode no signal is being transmitted to the transceiver. Hence, no noise associated with switching and AC signals is transmitted.

In contrast, during transmit or receive modes, the gating signal 506 turns (i.e., switches) on the digital transistor 504 by supplying a base current to the base of the digital transistor 504. The base current causes the collector current to flow into the ground through the emitter of the digital transistor 504. That is, when the digital transistor 504 is turned on by the gating signal, the collector-to-emitter path of the digital transistor 504 becomes, in effect, a short circuit. Hence, the clock signal 502 is drawn through the collector and emitter and into the ground. In this manner, the clock signal is blocked out from the rest of the circuit during transmit or receive modes of a TDMA device.

When the clock signal is blocked out, the holding capacitors 516 hold the negative DC voltage with some small allowable drop in the voltage due to discharge. In the present embodiment, this negative DC voltage from the holding capacitors 516 provides the voltage power supply to the TDMA device coupled to the negative DC voltage output. Hence, no noise or harmonics associated with the AC signal or switching are transmitted to the sensitive parts of the TDMA device during transmission or reception of information.

The present invention, a method and system for providing clean voltage power supply for TDMA radio systems, utilizes the alternating sequences of transmission/ reception and idle periods to supply a clean DC voltage output to sensitive parts of a TDMA transceiver. While the present invention has been described in particular embodiments, it should be appreciated that the present invention should not be construed as being limited by such embodiments, but rather construed according to the claims below.

What is claimed is:

1. An apparatus for eliminating interfering harmonics caused by an AC signal source used for providing power to a time division communications system characterized by periods of inactivity between periods of active communications, wherein said apparatus comprises:

a voltage converter coupled to the AC signal source for generating a DC signal therefrom;

a switching transistor responsive to the gating signal for switching the AC signal source to the voltage converter;

a gating signal coupled to the AC signal source for connecting the AC signal source to the voltage converter during the periods of inactivity, and for disconnecting the AC signal source during the periods of active communications; and a voltage holding and sampling circuit coupled to the voltage converter for storing the DC signal during the periods of inactivity when the AC signal source is connected, and for supplying an ultra-clean DC signal to the switching transistor during the periods of active communications when the AC signal source is disconnected, thereby eliminating interfering harmonics from the AC signal source.

2. The apparatus as recited in claim 1, wherein the voltage converter circuit further comprises:

a voltage multiplier for multiplying the voltage of the AC signal; and a rectifier circuit coupled to the voltage multiplier for rectifying the multiplied voltage.

3. The apparatus as recited in claim 1, wherein the AC signal source is an oscillator.

4. The apparatus as recited in claim 1, wherein the AC signal source is a digital clock.

5. The apparatus as recited in claim 1, wherein the switching transistor is digital transistor.

6. The apparatus as recited in claim 1, wherein the switching transistor includes a base coupled to the controlling signal source, an emitter coupled to a ground, and a collector coupled to the AC signal source and the voltage converter circuit.

7. The apparatus as recited in claim 1, wherein the DC output voltage is negative.

8. The apparatus as recited in claim 1, wherein the DC output voltage is positive.

9. The apparatus as recited in claim 1, wherein the voltage sampling and holding means includes a capacitor.

10. The apparatus as recited in claim 2, wherein the voltage multiplier circuit is an LC tank circuit.

11. The apparatus as recited in claim 2, wherein the rectifier circuit includes a plurality of diodes.

12. A method for generating a clean DC voltage power supply for a time division communications system characterized by periods of inactivity between periods of active communications, said method comprising the steps of:

generating an AC signal;

switching the AC signal such that the AC signal is turned off during the periods of active communications and turned on during the periods of inactivity;

converting the AC voltage to a DC output voltage;

charging a voltage charging and discharging circuit coupled to the DC output voltage when the AC signal is turned on and discharging the voltage charging and discharging circuit when the AC signal is turned off such that a clean voltage is supplied to the communications system during the periods of active communications.

13. The method as recited in claim 12, wherein the voltage converting step further includes:

multiplying the voltage of the AC signal; and rectifying the multiplied voltage.

14. The method as recited in claim 12, wherein the AC signal source is an oscillator.

15. The method as recited in claim 12, wherein the AC signal source is a digital clock.

16. The method as recited in claim 12, wherein the AC signal is switched by a switching transistor.

17. The method as recited in claim 12, wherein the DC output voltage is negative.

18. The method as recited in claim 12, wherein the DC output voltage is positive.

19. The method as recited in claim 12, wherein the AC signal is switched by a controlling signal.

20. The method as recited in claim 12, wherein the voltage charging and discharging circuit includes a capacitor.

21. The method as recited in claim 16, wherein the switching transistor includes a base coupled to a controlling signal source which turns on and off the transistor switch, an emitter coupled to a ground, and a collector coupled to the AC signal source.

* * * * *